US012578533B2

(12) United States Patent
Suwa et al.

(10) Patent No.: US 12,578,533 B2
(45) Date of Patent: Mar. 17, 2026

(54) FUSION SPLICING DEVICE AND CORE POSITION SPECIFICATION METHOD

(71) Applicant: Sumitomo Electric Optifrontier Co., Ltd., Yokohama (JP)

(72) Inventors: Takahiro Suwa, Yokohama (JP); Hiroki Akiyama, Yokohama (JP); Kazuyoshi Ooki, Yokohama (JP)

(73) Assignee: Sumitomo Electric Optifrontier Co., Ltd., Yokohama (JP)

( * ) Notice: Subject to any disclaimer, the term of this patent is extended or adjusted under 35 U.S.C. 154(b) by 227 days.

(21) Appl. No.: 18/551,616

(22) PCT Filed: Mar. 30, 2022

(86) PCT No.: PCT/JP2022/016087
§ 371 (c)(1),
(2) Date: Sep. 21, 2023

(87) PCT Pub. No.: WO2022/210911
PCT Pub. Date: Oct. 6, 2022

(65) Prior Publication Data
US 2024/0302592 A1      Sep. 12, 2024

(30) Foreign Application Priority Data

Mar. 31, 2021      (JP) ................................. 2021-061019

(51) Int. Cl.
*G02B 6/255* (2006.01)
(52) U.S. Cl.
CPC ......... *G02B 6/2555* (2013.01); *G02B 6/2551* (2013.01); *G02B 6/2553* (2013.01)
(58) Field of Classification Search
None
See application file for complete search history.

(56) References Cited

U.S. PATENT DOCUMENTS

2003/0164939 A1* 9/2003 Esmaeili .............. G02B 6/2551
                                                    356/73.1
2003/0172680 A1* 9/2003 Huang ................. G02B 6/2551
                                                    65/377
(Continued)

FOREIGN PATENT DOCUMENTS

JP       2004-506177 A      2/2004
JP       2008-519970 A      6/2008
(Continued)

OTHER PUBLICATIONS

International Search Report issued in Patent Application No. PCT/JP2022/016087 dated May 31, 2022.
(Continued)

*Primary Examiner* — Jerry Rahll
(74) *Attorney, Agent, or Firm* — McDonald Hopkins LLC

(57) ABSTRACT

A fusion splicing device according to one embodiment includes: a discharge electrode; a microscope acquiring luminance information from the optical fiber; a distribution information acquisition unit acquiring distribution information indicating a relationship between a position of the optical fiber in a radial direction and the luminance information; and a core position specification unit specifying a position of a core of the optical fiber from the distribution information. The microscope acquires the luminance information multiple times. The distribution information acquisition unit acquires the distribution information from each of a plurality of the luminance information. The core position specification unit specifies the position of the core of the optical fiber by performing weighting so that a weight of the distribution information based on the luminance information acquired earlier is allowed to be equal to or heavier than a weight of the distribution information based on the luminance information acquired later.

4 Claims, 7 Drawing Sheets

(56)         References Cited

U.S. PATENT DOCUMENTS

2006/0051043 A1*   3/2006   Huang ................. G02B 6/2551
                                                                           385/134
2016/0216448 A1*   7/2016   Sato ..................... G02B 6/2553

FOREIGN PATENT DOCUMENTS

JP         2015-224919  A      12/2015
WO            01/098799  A2    12/2001
WO         2006/050974  A1      5/2006

OTHER PUBLICATIONS

Written Opinion issued in Patent Application No. PCT/JP2022/
016087 dated May 31, 2022.

* cited by examiner

FUSION SPLICING DEVICE AND CORE POSITION SPECIFICATION METHOD

TECHNICAL FIELD

The present disclosure relates to a fusion splicing device and a core position specification method.

This application claims priority based on Japanese application No. 2021-061019 filed on Mar. 31, 2021, and incorporates all the content described in the Japanese application.

BACKGROUND ART

Patent Literature 1 describes a method for specifying a type of an optical fiber in a fusion splicing device. The fusion splicing device includes a pair of the discharge electrodes fusion-splicing a pair of optical fibers together, an imaging element imaging a pair of the optical fibers, and an image processing unit performing image processing on a pair of the optical fibers imaged by the imaging element. The imaging element acquires an image of the optical fiber in a heated state by the discharge and an image of the optical fiber in an unheated state. The image processing unit specifies a type of the optical fiber by performing image processing on the image of the optical fiber in the heated state and the image of the optical fiber in the unheated state.

Patent Literature 2 describes specifying an eccentricity of a core of an optical fiber in a method for coupling optical waveguides. In this method, heating the optical waveguide excites the core, and visible light is emitted from the core. A position of the core is specified from the intensity distribution of the emitted visible light. After that, an illumination unit illuminates the optical waveguide, and the position of the clad is specified by measuring the intensity distribution of the light illuminated to the optical waveguide. An eccentricity of the core in the optical fiber is specified from the specified core position and clad position.

Patent Literature 3 describes the fusion splicing device that heats a pair of the optical fibers by the discharge. In the fusion splicing device, images of thermoluminescence generated from the core and clad of the optical fiber heated by the discharge are acquired. The core dopant concentration is higher than the cladding dopant concentration. Therefore, the acquired luminance waveform of thermoluminescence has a peak at the core portion. This peak has a high correlation with a mode field diameter (MFD) of the optical fiber. In this fusion splicing device, the MFD of the optical fiber is obtained from the luminance waveform by using the fact that the peak of the luminance waveform has a high correlation with the MFD.

CITATION LIST

Patent Literature

Patent Literature 1: U.S. Patent Application Publication No. 2003/0164939
Patent Literature 2: Japanese Unexamined Patent Publication No. 2008-519970
Patent Literature 3: U.S. Patent Application Publication No. 2006/0051043

SUMMARY OF INVENTION

A fusion splicing device according to the present disclosure is the fusion splicing device fusion-splicing a pair of optical fibers to each other by discharge. The fusion splicing device includes: a discharge electrode generating the discharge; a microscope acquiring luminance information from the optical fiber heated by receiving the discharge; a distribution information acquisition unit acquiring distribution information indicating a relationship between a position of the optical fiber in a radial direction and the luminance information; and a core position specification unit specifying a position of a core of the optical fiber from the distribution information. The microscope acquires the luminance information multiple times with a time difference. The distribution information acquisition unit acquires the distribution information from each of a plurality of the luminance information. The core position specification unit specifies the position of the core of the optical fiber by performing weighting so that a weight of the distribution information based on the luminance information acquired earlier among a plurality of the distribution information is allowed to be equal to or heavier than a weight of the distribution information based on the luminance information acquired later.

The core position specification method according to the present disclosure is the core position specification method for specifying a position of each core of a pair of optical fibers when a pair of the optical fibers are fusion-spliced to each other by discharge. The core position specification method includes: a process of generating the discharge; a process of acquiring luminance information from the optical fiber heated by receiving the discharge; a process of acquiring distribution information indicating a relationship between a position of the optical fiber in a radial direction and the luminance information; and a process of specifying a position of a core of the optical fiber from the distribution information. In the process of acquiring the luminance information, the luminance information is acquired multiple times with a time difference. In the process of acquiring the distribution information, the distribution information is acquired from each of a plurality of the luminance information. In the process of specifying the positions of the cores, the position of the core of the optical fiber is specified by performing weighting so that a weight of the distribution information based on the luminance information acquired earlier among a plurality of the distribution information is allowed to be equal to or heavier than a weight of the distribution information based on the luminance information acquired later.

DESCRIPTION OF EMBODIMENTS

Figure 1:
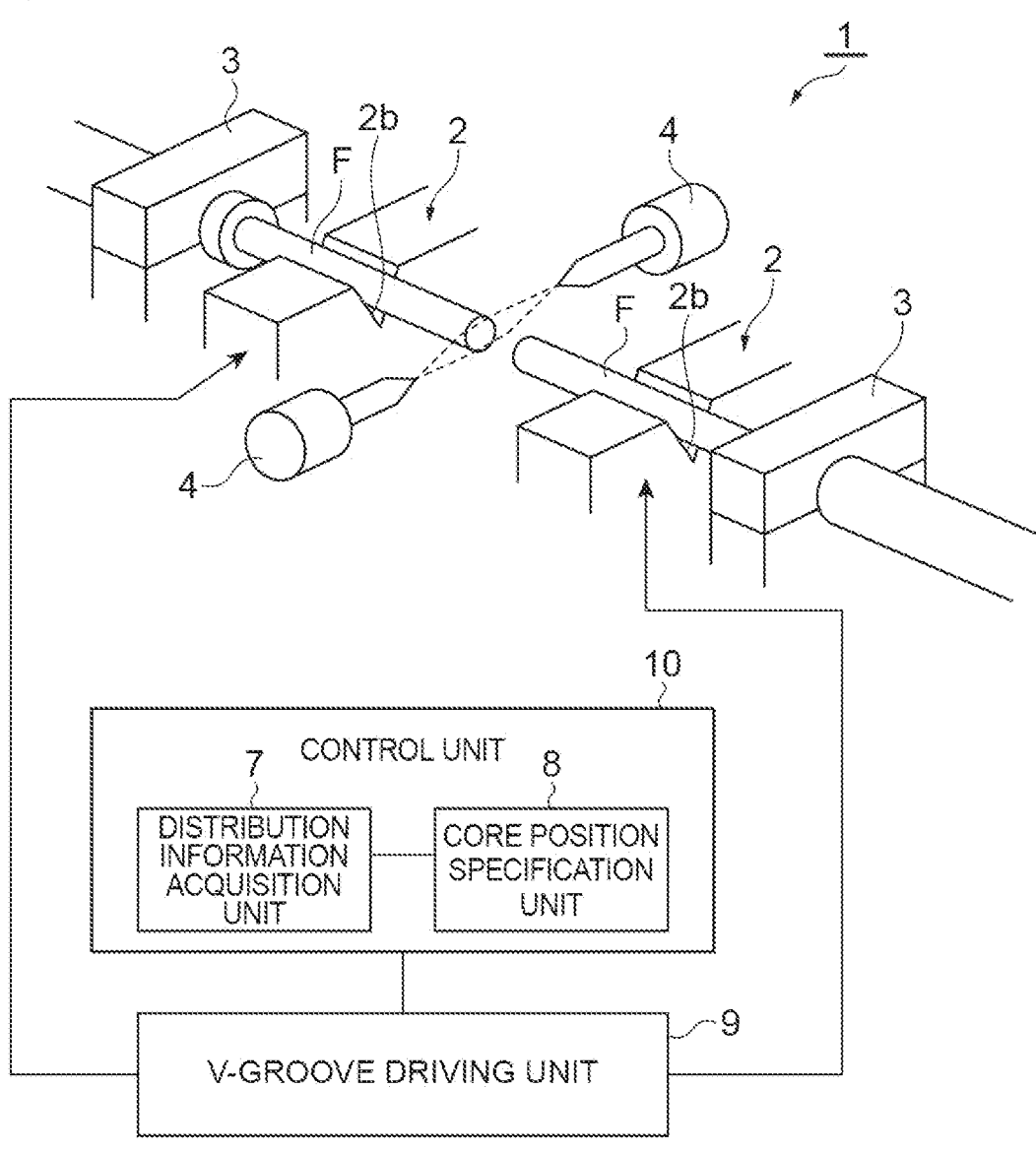
FIG. 1 is a diagram describing an overview of a fusion splicing device according to an embodiment.

By the way, in a fusion splicing device, when a resolution of a microscope is not sufficient, a position of a core may not be accurately specified from an image of an optical fiber. In this case, when a luminance waveform is acquired from the image of the optical fiber, a position of a peak cannot be obtained appropriately in the luminance waveform. As a result, the position of the core of the optical fiber may not be accurately specified. Therefore, it is required to specify the position of the core of the optical fiber with higher accuracy.

An object of the present disclosure is to provide a fusion splicing device and a core position specification method capable of specifying a position of a core of an optical fiber with high accuracy.

Description of Embodiments of Present Disclosure

First, embodiments of the present disclosure will be listed and described. A fusion splicing device according to one embodiment is a fusion splicing device fusion-splicing a pair of optical fibers to each other by discharge. The fusion splicing device includes a discharge electrode generating a discharge, a microscope acquiring luminance information generated from an optical fiber heated by receiving the discharge, a distribution information acquisition unit acquiring distribution information indicating a relationship between a position in a radial direction of the optical fiber and luminance information, and a core position specification unit specifying a position of a core of the optical fiber from the distribution information. The microscope acquires the luminance information multiple times with a time difference. The distribution information acquisition unit acquires the distribution information from each of a plurality of the luminance information. The core position specification unit specifies the position of the core of the optical fiber by performing the weighting so that the weight of the distribution information based on the luminance information acquired earlier among a plurality of the distribution information is allowed to be equal to or heavier than the weight of the distribution information based on the luminance information acquired later. Herein, the microscope includes an observation lens group and an imaging element.

The core position specification method according to one embodiment is a core position specification method specifying the position of each core of a pair of the optical fibers when a pair of the optical fibers are fusion-spliced to each other by discharge. The core position specification method includes a process of generating the discharge, a process of acquiring the luminance information of light generated from the optical fiber heated by receiving the discharge, a process of acquiring the distribution information indicating the relationship between the position of the optical fiber in the radial direction and the luminance information, and a process of specifying the position of the core of the optical fiber from the distribution information. In the process of acquiring the luminance information, the luminance information is acquired multiple times with a time difference. In the process of acquiring the distribution information, the distribution information is acquired from each of a plurality of the luminance information. In the process of specifying the position of the core, the position of the core of the optical fiber is specified by performing the weighting so that the weight of the distribution information based on the luminance information acquired earlier among a plurality of the distribution information is allowed to be equal to or heavier than the weight of the distribution information based on the luminance information acquired later.

In this fusion splicing device and the core position specification method, a pair of the optical fibers are heated by the discharge. When the optical fiber is heated, the core emits light more intensely than the clad. In this fusion splicing device and the core position specification method, the position of the core is specified by using a property of the core to emit light more intensely. The plurality of the distribution information indicating the relationship between the position of the optical fiber in the radial direction and the luminance information of the emitted light are acquired, and the position of the core is specified from a plurality of the distribution information. Therefore, by using a plurality of the distribution information, variations in the positions of the specified cores can be suppressed, so that the accuracy of specifying of the position of the core can be improved. The distribution information based on the luminance information of the optical fiber due to the light emission changes with the lapse of time. In the luminance distribution in the radial direction of the optical fiber obtained from the luminance information and the position information, a high luminance portion (peak) occurs in the portion corresponding to the core in the luminance distribution due to the light intensely emitted from the core. However, since the peak of this luminance distribution becomes broad as time elapses, it becomes more difficult to specify the exact position of the core from the distribution information as time elapses. On the other hand, since the peak in the distribution information of which the long time does not elapse from the discharge is not broad, the accurate position of the core can be specified from the distribution information. Therefore, the position of the core is specified by performing the weighting so that the weight of the distribution information based on the luminance information acquired earlier with respect to a plurality of the distribution information is allowed to be equal to or heavier than the weight of the distribution information based on the luminance information acquired later. As a result, the position of the core can be specified by allowing the weight of the distribution information that is not broad to be heavier so that the accuracy of specifying of the position of the core can be improved.

The core position specification unit may perform the weighting so that the weight of the distribution information based on the luminance information acquired earlier among a plurality of the distribution information is allowed to be heavier than the weight of the distribution information based on the luminance information acquired later. In this case, the weighting is performed so that the weight of the distribution information based on the earlier luminance information of which the peak is not broad is allowed to be heavier than the weight of the distribution information based on the later luminance information. Therefore, the accuracy of specifying of the position of the core can be further improved.

The microscope acquires the luminance information n times with a time difference (n is a natural number of 3 or more), the distribution information acquisition unit acquires the distribution information from each of n items of the luminance information, and the core position specification unit may perform the weighting so that the weight of the distribution information based on the luminance information acquired for the (n−1)-th time is allowed to be heavier than the weight of the distribution information based on the luminance information acquired for the n-th time. In this case, the position of the core is specified by allowing the weight of the distribution information based on the luminance information acquired for last (n−1)-th time which is one before the last to be heavier than the weight of the distribution information based on the luminance information acquired for last n-th time. Therefore, since the position of the core is specified so that the weight of the distribution information based on the luminance information acquired for the (n−1)-th time is allowed to be heavier than the distribution information based on the luminance information acquired for the n-th time of which the peak is broad, the accuracy of specifying of the position of the core can be further improved.

The core position specification unit may determine whether or not there is abnormality in each of a plurality of the distribution information, exclude the distribution information determined to be abnormal before specifying the position of the core, and specify the positions of the cores by using a plurality of the distribution information after the exclusion of the distribution information determined to be abnormal as a new plurality of the distribution information. In this case, the abnormal distribution information is not weighted, and the abnormal distribution information is excluded before the weighting. Then, the position of the core is specified by using the distribution information after the exclusion as a new plurality of the distribution information. Therefore, by excluding abnormal distribution information, the accuracy of specifying of the position of the core can be further improved.

Details of Embodiments of Present Disclosure

The specific examples of the fusion splicing device and the core position specification method according to the embodiment of the present disclosure will be described with reference to the drawings. In the description of the drawings, the same or corresponding elements are denoted by the same reference numerals, and overlapping descriptions are omitted as appropriate. The drawings may be partially simplified or exaggerated for easy understanding, and dimensional ratios and the like are not limited to those described in the drawings.

First, a configuration of an exemplary fusion splicing device will be described with reference to FIG. 1. FIG. 1 is a diagram describing an overview of the fusion splicing device. As illustrated in FIG. 1, the fusion splicing device 1 is a fusion splicing device for fusion-splicing a pair of optical fibers F to each other. The fusion splicing device 1 includes a V-groove clamp 2 having a V-groove 2b, a coated clamp 3, a pair of the discharge electrodes 4, a V-groove driving unit 9 driving the V-groove clamp 2, and a control unit 10. The control unit 10 has a distribution information acquisition unit 7 and a core position specification unit 8.

The V-groove clamp 2 and the coated clamp 3 are elements supporting the optical fiber F to be fusion-spliced. The optical fiber F to be connected is position-aligned in the V-groove 2b of the V-groove clamp 2. The V-groove clamp 2 supports a portion of a bare fiber from which coating has been removed from the optical fiber F to expose a glass portion. The coated clamp 3 holds a coated portion of the optical fiber F. In the fusion splicing device 1, the tips of a pair of the optical fibers F are supported by the V-groove clamp 2 and the coated clamp 3 so as to face each other.

A pair of the discharge electrodes 4 are arranged so as to face each other along a direction intersecting (for example, perpendicular to) the direction in which the optical fiber F extends. Each of the optical fibers F are aligned in each of a plurality of the V-grooves 2b.

In the fusion splicing device 1, position-alignment of a pair of the optical fibers F is performed by the V-groove driving unit 9 and the control unit 10. The V-groove driving unit 9 and the control unit 10 position-align a pair of the optical fibers F so that a pair of the optical fibers F are aligned on the straight line. After that, the discharge is performed between the discharge electrodes 4, and the ends of a pair of the optical fibers F are heated and fusion-spliced. For example, the control unit 10 controls the discharge current or the discharge time of the discharge electrode 4 so that the fusion-splicing is performed under the fusion-splicing conditions suitable for the type of the optical fiber F.

Figure 2:
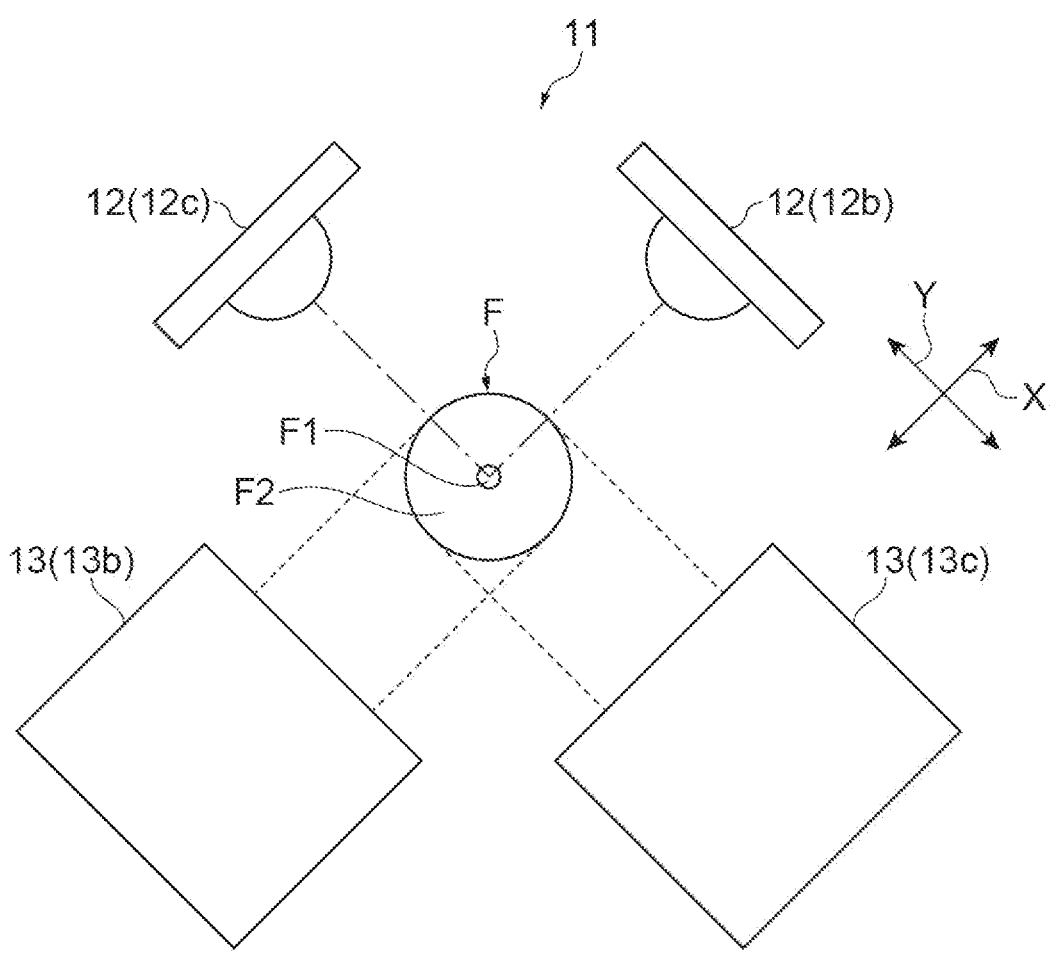
FIG. 2 is a diagram illustrating an optical system for observing an optical fiber in the fusion splicing device of FIG. 1.

The fusion splicing device 1 includes an image observation mechanism 11 observing the optical fiber F placed in the V-groove 2b of the V-groove clamp 2. FIG. 2 illustrates the configuration of the image observation mechanism 11. The image observation mechanism 11 has, for example, the light source 12 and the microscope 13. The light source 12 includes a first light source 12b and a second light source 12c. The microscope 13 includes a first microscope 13b and a second microscope 13c. The first light source 12b and the first microscope 13b are arranged along the X direction with the optical fiber F interposed therebetween. The second light source 12c and the second microscope 13c are arranged along the Y direction intersecting the X direction while interposing the optical fiber F therebetween.

The angle between the X direction and the Y direction is, for example, 60° or more and 120° or less. The first light source 12b emits light to the optical fiber F along the X direction. The second light source 12c emits light to the optical fiber F along the Y direction. The first microscope 13b observes a core F1 and a clad F2 of the optical fiber F by receiving light emitted along the X direction from the first light source 12b. The second microscope 13c observes the core F1 and clad F2 of the optical fiber F by receiving light emitted along the Y direction from the second light source 12c.

The configurations and functions of the first light source 12b and the second light source 12c are, for example, the same each other. The configurations and functions of the first microscope 13b and the second microscope 13c are, for example, the same each other. Therefore, hereinafter, the first light source 12b and the second light source 12c will be collectively described as the light source 12 unless it is particularly necessary to identify these light sources. The first microscope 13b and the second microscope 13c will be collectively referred to as the microscope 13 for description.

Figure 3:
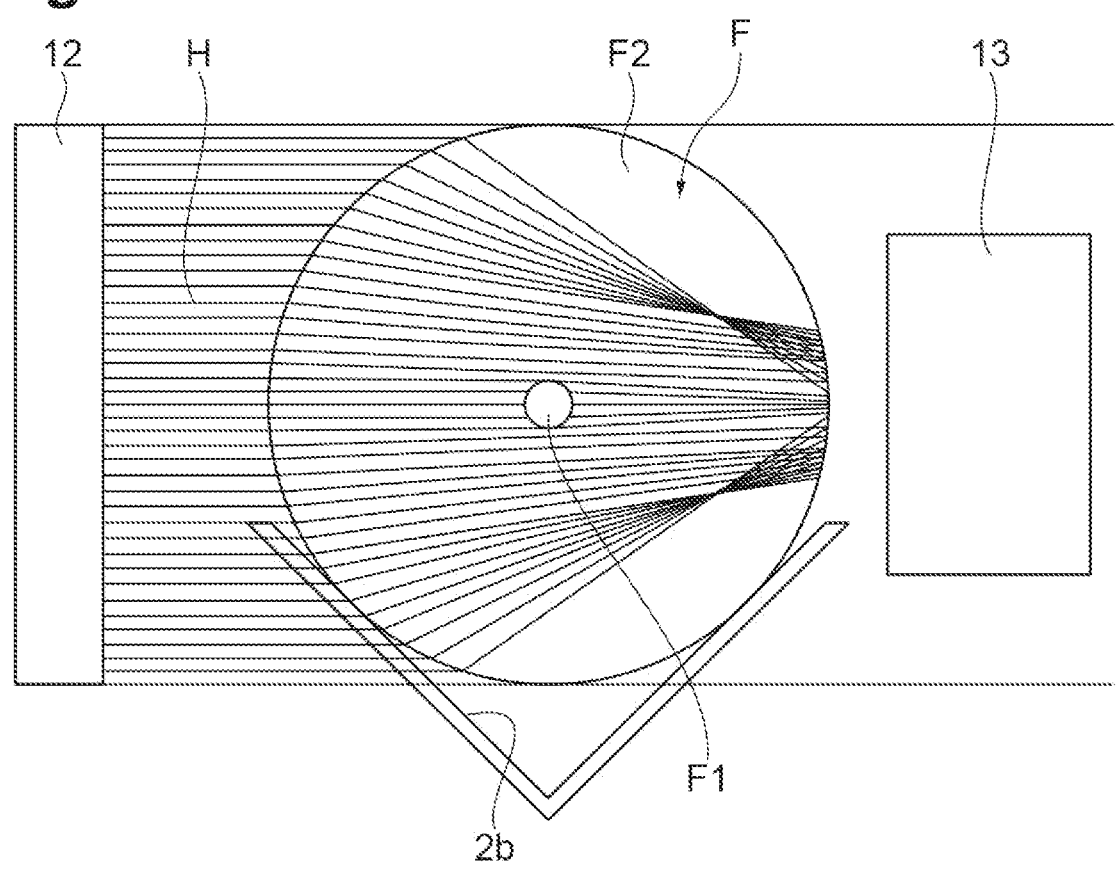
FIG. 3 is a diagram schematically illustrating a positional relationship between a light source and a microscope in the optical system of FIG. 2 and the optical fiber.

FIG. 3 is a diagram schematically illustrating a positional relationship among the light source 12, the optical fiber F, and the microscope 13. As illustrated in FIG. 3, the light source 12, the optical fiber F and the microscope 13 are arranged in a straight line. The light source 12 is, for example, a light emitting element such as a light emitting diode. As an example, the light source 12 emits light H that is red light. The microscope 13 observes the optical fiber F by receiving the light H emitted from the light source 12 to the optical fiber F placed on the V-groove 2b.

The microscope 13 has, for example, an observation lens and a camera. The camera is a charge-coupled device (CCD) camera, a complementary metal oxide semiconductor (CMOS) camera, or the like. For example, the position of the microscope 13 is fixed in the fusion splicing device 1, and the position of the microscope 13 remains unchanged. The observation results by the microscope 13 are acquired as, for example, images. The image of the optical fiber F acquired by the microscope 13 is transmitted to the control unit 10 as image data.

The V-groove driving unit 9 is driven based on, for example, a control signal input from the control unit 10. The V-groove driving unit 9 moves the V-groove 2b. As the control unit 10, for example, a central processing unit (CPU) configured by one or a plurality of integrated circuits (ICs) is used. The control unit 10 acquires the image of the optical fiber F from the microscope 13, and the image of the optical fiber F is stored in, for example, the control unit 10. The control unit 10 includes a core position specification unit 8 acquiring a center position of the core F1 of the optical fiber F from the image data of the optical fiber F acquired. The control unit 10 may output the control signal to the V-groove driving unit 9 by using an acquisition result to control the V-groove driving unit 9.

Figure 4:
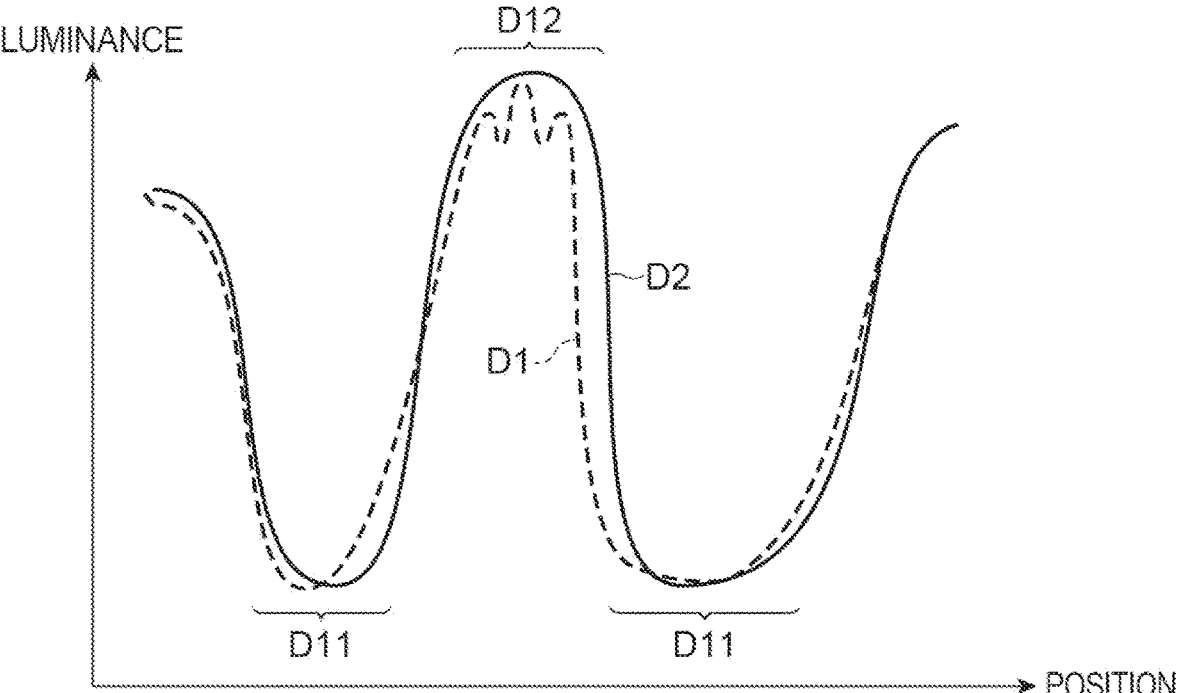
FIG. 4 is a luminance waveform illustrating a relationship between a radial position of the optical fiber and luminance obtained from a luminance image.

The control unit 10 acquires the luminance waveform of the optical fiber F from the image data of the optical fiber F acquired. FIG. 4 illustrates exemplary luminance waveforms D1 and D2 indicating a relationship between the position of the optical fiber F in the radial direction and the luminance of the image. As illustrated in FIGS. 3 and 4, in the image of the optical fiber F, as an example, the core F1 portion is displayed with high luminance and the clad F2 portion is displayed with low luminance. In the example of the image of the optical fiber F, the luminance decreases at the clad F2 portion of the optical fiber F and increases when reached to the core F1 of the optical fiber F. A ridge D12 with high luminance appears in the luminance waveforms D1 and D2 near a central portion interposed between a pair of valleys D11 with low luminance.

The control unit 10 may acquire an outer diameter of the optical fiber F by using the luminance waveforms D1 and D2. For example, the control unit 10 may extract a bright portion corresponding to the ridge D12 as a portion corresponding to the core, and acquire a width of the bright portion. In the case of the luminance waveform D1 with a high resolution of the microscope 13, the waveform at the ridge D12 can be acquired with high accuracy, so that the position of the core F1 can be specified with high accuracy. However, in the case of the luminance waveform D2 in which the resolution of the microscope 13 is low, the accuracy of the waveform at the ridges D12 may be low, so that there is the possibility that the position of the core F1 cannot be specified with high accuracy.

Figure 5:
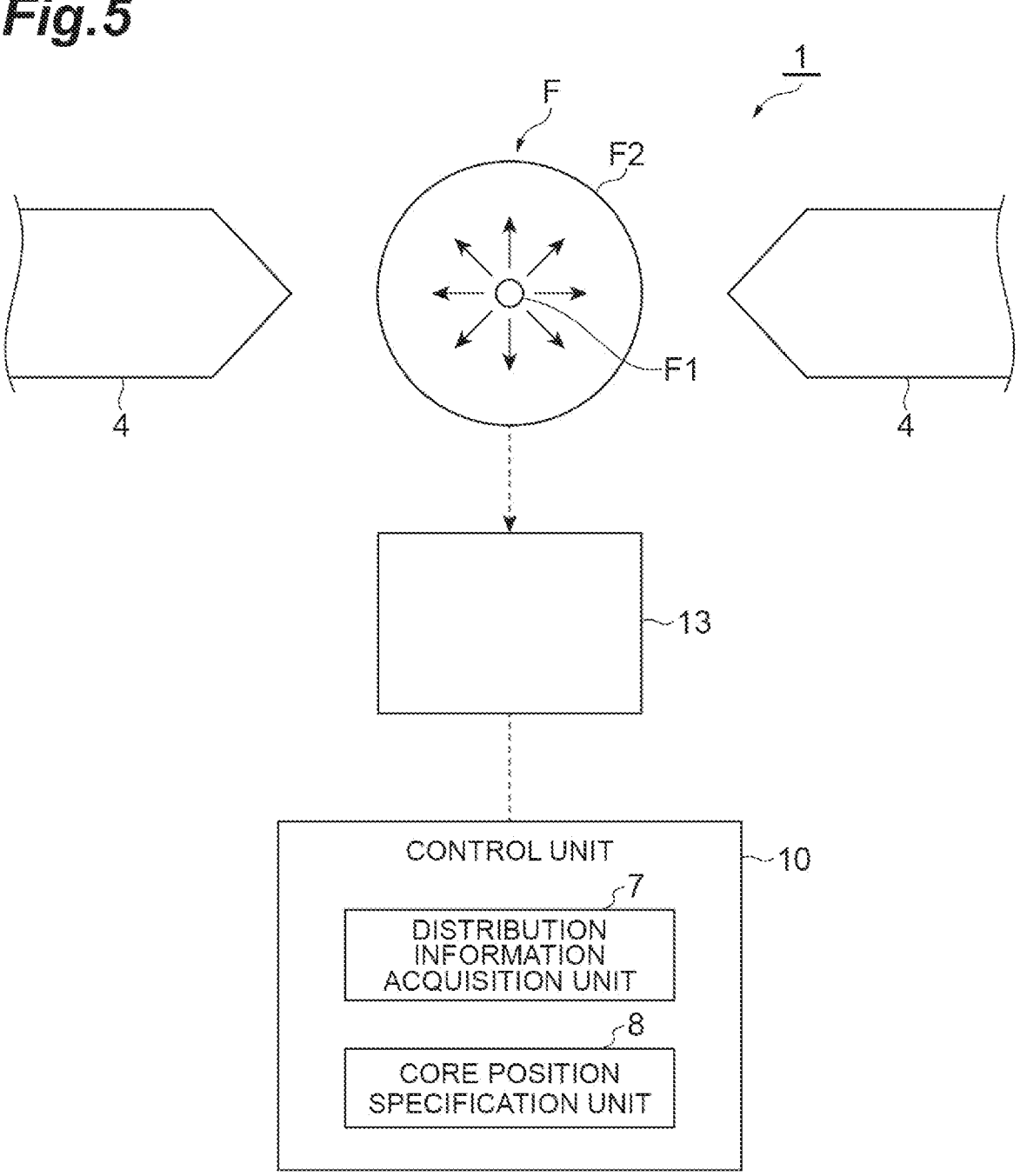
FIG. 5 is a diagram schematically illustrating a configuration relating to discharge to the optical fiber, observation of the optical fiber, and acquisition of the distribution information.

Therefore, in this embodiment, the position of the core F1 is specified by using the light emitted from the optical fiber F when the discharge electrode 4 discharges the optical fiber F. FIG. 5 is a diagram schematically illustrating a configuration of the fusion splicing device 1 for specifying the position of the core F1. As illustrated in FIG. 5, when the optical fiber F is heated by the discharge of the discharge electrode 4, the core F1 of the optical fiber F emits light more intensely than the clad F2 due to the influence of the dopants. The microscope 13 acquires the image of the light emission from the core F1 and acquires the image of the light emission from the optical fiber F.

Figure 6:
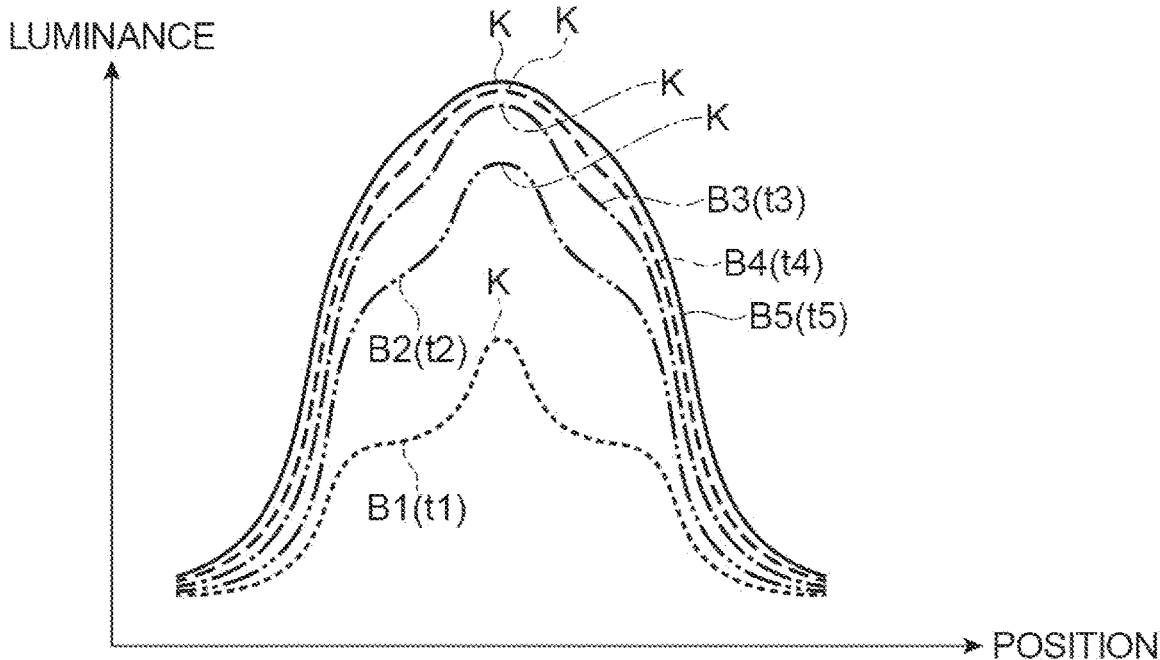
FIG. 6 is a graph schematically illustrating a relationship (distribution information) between the radial position of the optical fiber and the luminance of the luminance image of the optical fiber due to the light emission.

For example, the distribution information acquisition unit 7 acquires, as distribution information, the waveform representing the distribution of the light emission from the photographed image of the light emission of the optical fiber F acquired by the microscope 13. In the present embodiment, the "photographed image of the light emission (image of the light emission)" corresponds to an example of the "luminance information", and the "waveform (indicating the distribution of the light emission)" corresponds to an example of the "distribution information". For example, the microscope 13 photographs the optical fiber F emitting light multiple times with a time difference, and the distribution information acquisition unit 7 acquires the waveform multiple times with a time difference. FIG. 6 is a graph schematically illustrating the distribution information indicating the relationship between the position of the optical fiber F in the radial direction and the luminance information.

In FIG. 6, immediately after the discharge to the optical fiber F by the discharge electrode 4, illustrated are distribution information B1 obtained at time t1, distribution information B2 obtained at time t2 after time t1, distribution information B3 obtained at time t3 after time t2, distribution information B4 obtained at time t4 after time t3, and distribution information B5 obtained at time t5 after time t4. However, the number of the distribution information to be acquired may not be 5, and may be 2, 3, 4, or 6 or more. The time from time t1 to time t2, the time from time t2 to time t3, the time from time t3 to time t4, and the time from time t4 to time t5 are, for example, the same each other.

As illustrated in FIG. 6, all of the distribution information B1, B2, B3, B4, and B5 have peaks K near the central portion of the optical fiber F where the core F1 is presumed to exist. However, the peak K gradually becomes broad as time elapses from the discharge. Specifically, although a clear peak K is obtained at time t1 immediately after the discharge, the peak K gradually becomes smooth as time elapses from time t2 to time t3. Then, after the time t3, the waveform does not change so much, and the peak K becomes broad. As described above, in the distribution information obtained from the luminance information due to the light emission, the peak K becomes broad with the elapses of time, so that, it is desirable that the position of the core F1 is specified by placing importance on the distribution information acquired at the earlier timing.

The core position specification unit 8 specifies the position of the core F1 of the optical fiber F, for example, from the distribution information B1 to B5 acquired by the distribution information acquisition unit 7. The core position specification unit 8 specifies the position of the core F1 of the optical fiber F by performing weighting so that the weight of the distribution information B1 acquired earlier among the distribution information B1 to B5 is allowed to be equal to or heavier than the weight of the distribution information B2 acquired later. In the present embodiment, the core position specification unit 8 performs weighting so that the weight of the distribution information B1 is allowed to be equal to or heavier than the weight of the distribution information B2, so that the weight of the distribution information B2 is allowed to be equal to or heavier than the weight of the distribution information B3, so that the weight of the distribution information B3 is allowed to be equal to or heavier than the weight of the distribution information B4, and so that the weight of the distribution information B4 is allowed to be equal to or heavier than the weight of the distribution information B5.

The example of the weighting of the distribution information by the core position specification unit 8 will be described. For example, the position (position estimated to be the core) of the optical fiber F at the peak K of the distribution information B1 is denoted by X1, the position of the optical fiber F at the peak K of the distribution information B2 is denoted by X2, the position of the optical fiber F at the peak K of the distribution information B3 is denoted by X3, the position of the optical fiber F at the peak K of the distribution information B4 is denoted by X4, and the position of the optical fiber F at the peak K of the distribution information B5 is denoted by X5.

The core position specification unit 8 determines whether there is abnormality in the distribution information B1 to B5. The core position specification unit 8 eliminates distribution information determined to be abnormal before weighting, which will be described later. As a specific example, the core position specification unit 8 compares each of the positions X1 to X5 of the distribution information B1 to B5 with the constant value. Then, when the difference between each of the positions X1 to X5 and a constant value is allowed to be equal to or greater than a threshold value, the core position specification unit 8 excludes the distribution information B1 to B5. In the following, the case in which none of the distribution information B1 to B5 is excluded will be exemplified.

The core position specification unit 8 specifies the position Z of the core F1 by the following equation (1) by using the weight (weighting coefficient) to the distribution information B1 as W1, using the weight to the distribution information B2 as W2 which is W1 or less, using the weight to the distribution information B3 as W3 which is W2 or less, using the weight to the distribution information B4 as W4 which is W3 or less, and using the weight to the distribution information B5 as W5 which is W4 or less. The sum of W1 to W5 is one.

$$Z = (X1) \times W1 + (X2) \times W2 + (X3) \times W3 + (X4) \times W4 + (X5) \times W5 \quad (1)$$

Heretofore, the example of the weighting of the distribution information and the specifying of the position of the core F1 by the core position specification unit 8 has been described above. However, the weighting of the distribution information and the method of specifying the position of the core F1 are not limited to the above examples, and can be changed as appropriate.

For example, in the above example, when specifying the position Z of the core F1 after obtaining the positions X1 to X5 from each of the distribution information B1 to B5, a weighting coefficient Wi for the distribution information Bi (i is a natural number) determined to be abnormal may be set to 0. In addition, the distribution information Bi determined to be abnormal may be excluded (it may not be included in the calculation) before the positions X1 to X5 are obtained from the distribution information B1 to B5, respectively. In the example described above, the positions X1 to X5 are used in determining whether or not there is abnormality. However, by determining whether or not there is abnormality based on other criteria and by using the determination result, the abnormal distribution information can be excluded before obtaining the positions X1 to X5.

Regarding the weighting, on the luminance information X (t, m, n) at a certain time t and the specific position (m, n) (m, n are relative coordinates indicating the position information), the weighting process is performed earlier, and a weight added average value XS may be obtained as in the equation (2).

$$XS(m, n) = X(1, m, n) \times W1 + X(2, m, n) \times W2 + \quad (2)$$
$$X(3, m, n) \times W3 + X(4, m, n) \times W4 + X(5, m, n) \times W5$$

The position Z of the core F1 may be specified by using XS(m, n) thus obtained.

Figure 7:
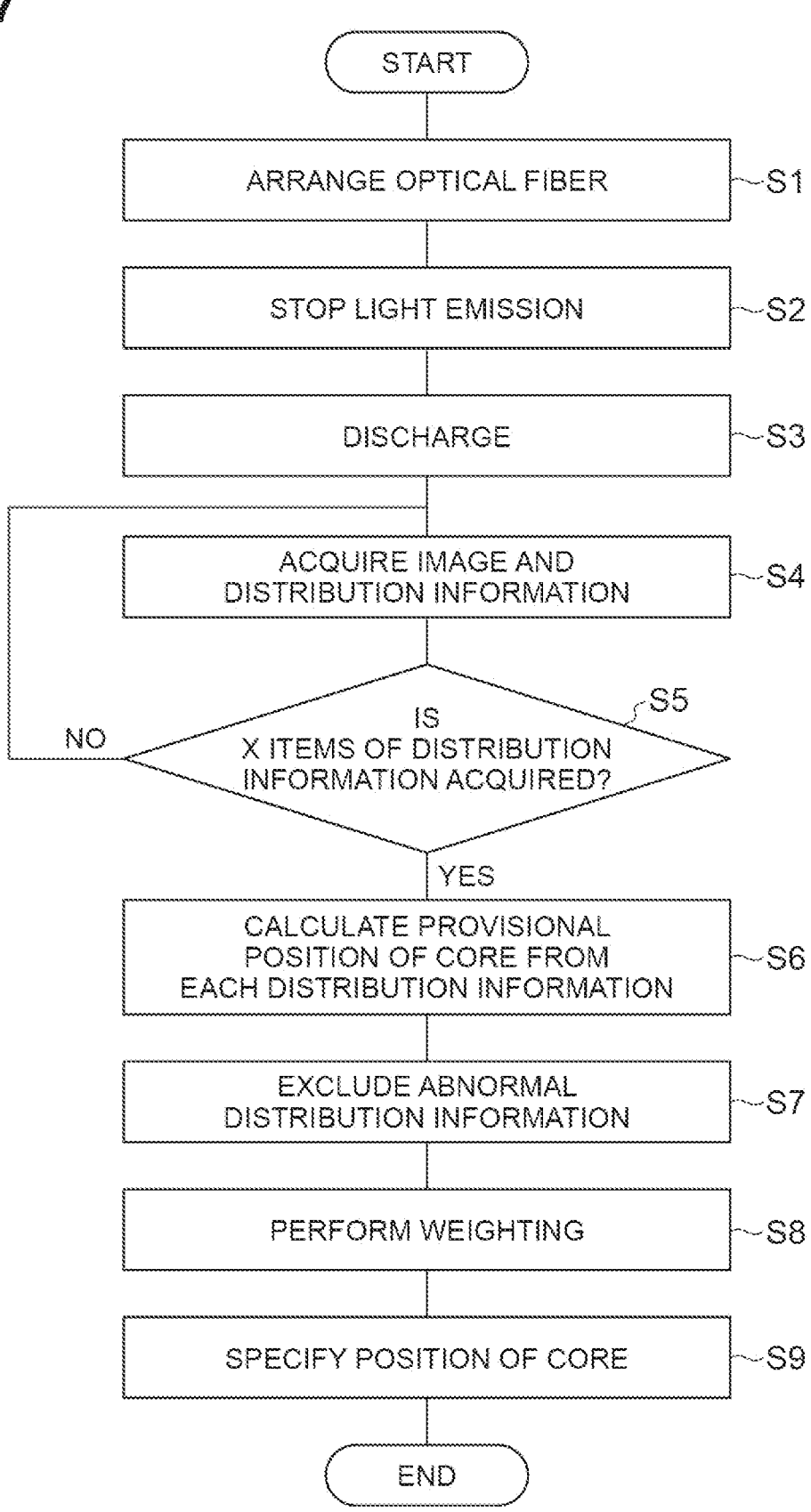
FIG. 7 is a flowchart illustrating an example of processes of a core position specification method according to an embodiment.

Next, the core position specification method according to the embodiment will be described with reference to FIG. 7. FIG. 7 illustrates an example of the processes of the core position specification method according to the embodiment. First, a pair of the optical fibers F are arranged in the V-groove 2b of the V-groove clamp 2 (step S1). At this time, the optical fiber F is supported by the V-groove clamp 2 and the coated clamp 3. The optical fibers F are position-aligned in the V-grooves 2b so that the tips of a pair of the optical fibers F face each other.

Next, the light source 12 stops emitting the light H (step S2). That is, the light source 12 is stopped in order to eliminate the influence of the light H from the light source 12. After that, the discharge electrode 4 discharges the optical fiber F (step S3). The optical fiber F is heated by the discharge to emit light, and the microscope 13 acquires the luminance image (luminance information) of the emitted light. Then, the distribution information acquisition unit 7 acquires the above-described distribution information from the luminance information (step S4).

For example, it is determined whether or not the distribution information acquisition unit 7 acquires X items of the distribution information (X is a natural number of 2 or more) (step S5). Then, when it is determined that X items of the distribution information are acquired, the process proceeds to step S6. On the other hand, when it is determined that X items of the distribution information are not acquired, the process returns to step S4, and acquisition of the luminance information by the microscope 13 and acquisition of the distribution information by the distribution information acquisition unit 7 are executed again.

In the following, the example in which the value of X is 5 and the distribution information acquisition unit 7 acquires the distribution information B1 to B5 will be described. At step S6, the core position specification unit 8 specifies a provisional position of the core F1 from each of the distribution information B1 to B5. As a specific example, the core position specification unit 8 acquires the positions X1 to X5 of the peak K illustrated in FIG. 6 as the provisional positions of the core F1.

The core position specification unit 8 determines whether or not there is abnormality in each of the distribution information B1 to B5 acquired by the distribution information acquisition unit 7, and excludes the distribution information determined to be abnormal (step S7). Then, the core position specification unit 8 performs the weighting on each of the distribution information B1 to B5 that are not determined to be abnormal (step S8). As a specific example, the core position specification unit 8 determines the weight W1 to the distribution information B1, the weight W2 to the distribution information B2, the weight W3 to the distribution information B3, the weight W4 to the distribution information B4, and the weight W5 to the distribution information B5. At this time, the respective weights are determined so that the weight W1 is allowed to be equal to or heavier than the weight W2, the weight W2 is allowed to be equal to or heavier than the weight W3, the weight W3 is allowed to be equal to or heavier than the weight W4, and the weight W4 is allowed to be equal to or heavier than the weight W5.

Then, the core position specification unit 8 specifies the position of the core F1 of the optical fiber F by using the weights W1 to W5 (step S9). As a specific example, the core position specification unit 8 specifies the position Z of the core F1 according to the equation (1) described above.

Through the above-described processes, a series of processes of the core position specification method are ended.

The functions and effects obtained from the fusion splicing device 1 and the core position specification method according to this embodiment will be described. In the fusion splicing device 1 and the core position specification method according to this embodiment, a pair of the optical fibers F are heated by the discharge. When the optical fiber F is heated, the core F1 emits light more intensely than the clad F2.

In the fusion splicing device 1 and the core position specification method, the position of the core F1 is specified by using the property that the core F1 emits light more intensely. The distribution information B1 to B5 indicating the relationship between the position of the optical fiber F in the radial direction and the luminance information (for example, the luminance of the image of the light emission) is acquired, and the position of the core F1 is specified from the distribution information B1 to B5. Therefore, by using the distribution information B1 to B5, which are a plurality of the distribution information, variations in the core F1 to be specified can be suppressed, so that the accuracy of specifying of the position of the core F1 can be improved.

The distribution information based on the luminance information of the optical fiber F due to the light emission changes over time. In the distribution information B1 to B5, the peak K is generated in the portion of the core F1 due to the intense light emission of the core F1. Since the peak K of the distribution information B1 to B5 becomes broad as time elapses, it becomes more difficult to specify the exact position of the core F1 as time elapses. On the other hand, since the peak K in the distribution information B1 of which the long time does not elapse from the discharge is not broad, the accurate position of the core F1 can be specified from the distribution information B1. Therefore, the position of the core F1 is specified by performing the weighting so that, for example, the weight W1 of the distribution information B1 based on the luminance information acquired earlier among the distribution information B1 to B5 is allowed to be equal to or heavier than the weight W2 of the distribution information B2 based on the luminance information acquired later. As a result, since the position of the core F1 can be specified by allowing the weight W1 of the distribution information B1 that is not broad to be larger, the accuracy of specifying of the position of the core F1 can be improved.

The microscope 13 may acquire the luminance information n times with a time difference (n is a natural number of 3 or more), and the distribution information acquisition unit 7 may acquire the distribution information from each of n items of the luminance information. The core position specification unit 8 may perform the weighting so that the weight of the distribution information based on the luminance information acquired for the (n−1)-th time is allowed to be heavier than the weight of the distribution information based on the luminance information acquired for the n-th time. As a specific example, the microscope 13 may acquire the luminance information of the optical fiber F five times (for example, the images are photographed five times) with a time difference, and the distribution information acquisition unit 7 may acquire the distribution information B1 to B5 based on each of the five items of luminance information. Then, the core position specification unit 8 may perform the weighting so that the weight W4 of the distribution information B4 based on the luminance information acquired for the fourth time is allowed to be heavier than the weight W5 of the distribution information B5 based on the luminance information acquired for the fifth time.

In this case, the position of the core F1 is specified by performing the weighting so that the weight of the distribution information based on the acquired luminance information for the (n−1)-th time which is one before the last is allowed to be heavier than the weight of the distribution information based on the last acquired luminance information for the n-th time. Therefore, since the position of the core F1 is specified by performing the weighting so that the weight of the distribution information based on the luminance information acquired for the (n−1)-th time is allowed to be heavier than the distribution information based on the luminance information acquired for the n-th time in which the peak K is broad, the accuracy of specifying of the position of the core F1 can be improved. It is noted that the core position specification unit 8 performs the weighting so that the weight W1 of the distribution information B1 based on the luminance information acquired for the first time is allowed to be heavier than the weight W2 of the distribution information B2 based on the luminance information acquired for the second time. In this case also, the same effect as described above can be obtained.

The core position specification unit 8 may perform the weighting so that the weight of the distribution information based on the luminance information acquired earlier among the distribution information B1 to B5 is allowed to be heavier than the weight of the distribution information based on the luminance information acquired later. As a specific example, the weight W1 may be larger than the weight W2, the weight W2 may be larger than the weight W3, the weight W3 may be larger than the weight W4, and the weight W4 may be larger than the weight W5. In this case, the weighting is performed so that the weight of the distribution information based on the earlier luminance information of which the peak K is not broad is allowed to be heavier than the weight of the distribution information based on the later luminance information, and therefore, the accuracy of specifying of the position of the core F1 can be improved.

The core position specification unit 8 may determine whether or not there is abnormality for each of the distribution information B1 to B5, may exclude the distribution information determined to be abnormal before the weighting, and may specify the position of the core F1 by using a plurality of the distribution information B1 to B5 after excluding the distribution information determined to be abnormal as the new plurality of distribution information B1 to B5. In this case, the weighting is not performed on the abnormal distribution information, and the abnormal distribution information is excluded before performing the weighting. Then, the position of the core F1 is specified by using the distribution information B1 to B5 after the exclusion as a new plurality of the distribution information B1 to B5. Therefore, by excluding the abnormal distribution information, the accuracy of specifying of the position of the core F1 can be further improved.

In the fusion splicing device 1 according to this embodiment, the position of the microscope 13 is fixed in the fusion splicing device 1, and the position of the microscope 13 remains unchanged. Even when the microscope 13 is fixed in this way, the microscope 13 acquires the luminance information multiple times with a time difference, and the core position specification unit 8 performs the weighting so that the weight W1 of the distribution information B1 based on the earlier acquired luminance information is allowed to be equal to or heavier than the weight W2 of the distribution information B2 based on the later acquired luminance information. Therefore, the position of the core F1 can be specified with high accuracy. That is, when the microscope 13 is fixed or when the resolution of the microscope 13 is low, the position of the core F1 can be specified with high accuracy.

The embodiments of the fusion splicing device and the core position specification method according to the present disclosure have been described above. However, the invention is not limited to the embodiments described above. That is, it is easily recognized by those skilled in the art that the present invention does various modifications and changes within the range of the gist described in the scope of the claims. The configuration of each element of the fusion splicing device and the contents and order of the processes of the core position specification method are not limited to the above-described embodiments and can be changed as appropriate.

For example, in the above-described embodiment, the core position specification unit 8 has been described that the core position specification unit 8 performs the weighting so that the weight W1 of the distribution information B1 acquired for the first time is allowed to be equal to or heavier than the weight W2 of the distribution information B2, the weight W2 of the distribution information B2 is allowed to be equal to or heavier than the weight W3 of the distribution information B3, the weight W3 of the distribution information B3 is allowed to be equal to or heavier than the weight W4 of the distribution information B4, and the weight W4 of the distribution information B4 is allowed to be equal to or heavier than the weight W5 of the distribution information B5. However, the core position specification unit may use different weighting coefficients depending on the time from the discharge. Specifically, the core position specification unit may allow the weight r1 to be equal to or larger than the weight r2 and may allow the weight r2 to be equal to or larger than the weight r3 by assigning a weight to the distribution information obtained from the discharge start time v0 to the time v1 to r1, assigning a weight to the distribution information obtained from the time v1 to the time v2 to r2, and assigning a weight to the distribution information obtained after the time v2 to r3. In this case as well, since the distribution information based on the luminance information in which the long time does not elapse from the discharge can be preferentially used to specify the position of the core, similar to the above-described embodiments, the functions and effects can be obtained.

REFERENCE SIGNS LIST

1: fusion splicing device, 2: V-groove clamp, 2b: V-groove, 3: coated clamp, 4: discharge electrode, 7: distribution information acquisition unit, 8: core position specification unit, 9: V-groove driving unit, 10: control unit, 11: image observation mechanism, 12: light source, 12b: first light source, 12c: second light source, 13: microscope, 13b: first microscope, 13c: second microscope, B1 to B5: distribution information, D1, D2: luminance waveform, D11: valley, D12: ridge, F: optical fiber, F1: core, F2: clad, H: light, K: peak.

What is claimed is:

1. A fusion splicing device being the fusion splicing device fusion-splicing a pair of optical fibers to each other by discharge, comprising:
   a discharge electrode generating the discharge;
   a microscope acquiring luminance information from the optical fiber heated by receiving the discharge;

a distribution information acquisition unit acquiring distribution information indicating a relationship between a position of the optical fiber in a radial direction and the luminance information; and
   a core position specification unit specifying a position of a core of the optical fiber from the distribution information,
   wherein the microscope acquires the luminance information multiple times with a time difference,
   wherein the distribution information acquisition unit acquires the distribution information from each of a plurality of the luminance information, and
   wherein the core position specification unit specifies the position of the core of the optical fiber by performing weighting so that a weight of the distribution information based on the luminance information acquired earlier among a plurality of the distribution information is allowed to be heavier than a weight of the distribution information based on the luminance information acquired later.

2. The fusion splicing device according to claim 1,
   wherein the microscope acquires the luminance information n times with a time difference (n is a natural number of 3 or more),
   wherein the distribution information acquisition unit acquires the distribution information from each of n items of the luminance information, and
   wherein the core position specification unit performs the weighting so that the weight of the distribution information based on the luminance information acquired for an $(n-1)$-th time is allowed to be heavier than the weight of the distribution information based on the luminance information acquired for an n-th time.

3. The fusion splicing device according to claim 1,
   wherein the core position specification unit determines whether or not there is abnormality in each of a plurality of the distribution information, excludes the distribution information determined to be abnormal before specifying the position of the core, and specifies the position of the core by using a plurality of the distribution information after excluding the distribution information determined to be abnormal as a new plurality of the distribution information.

4. A core position specification method being the core position specification method for specifying a position of each core of a pair of optical fibers when a pair of the optical fibers are fusion-spliced to each other by discharge, comprising:
   a process of generating the discharge;
   a process of acquiring luminance information from the optical fiber heated by receiving the discharge;
   a process of acquiring distribution information indicating a relationship between a position of the optical fiber in a radial direction and the luminance information; and
   a process of specifying a position of a core of the optical fiber from the distribution information,
   wherein, in the process of acquiring of the luminance information, the luminance information is acquired multiple times with a time difference,
   wherein, in the process of acquiring of the distribution information, the distribution information is acquired from each of a plurality of the luminance information, and
   wherein, in the process of specifying of the positions of the cores, the position of the core of the optical fiber is specified by performing weighting so that a weight of the distribution information based on the luminance information acquired earlier among a plurality of the distribution information is allowed to be heavier than a weight of the distribution information based on the luminance information acquired later.

\*    \*    \*    \*    \*